(12) United States Patent
Saunders et al.

(10) Patent No.: US 6,373,895 B2
(45) Date of Patent: Apr. 16, 2002

(54) VIDEO DATA COMPRESSION WITH TRIAL ENCODER

(75) Inventors: Nicholas Ian Saunders; Clive Henry Gillard; Michael John Ludgate, all of Basingstoke (GB)

(73) Assignees: Sony Corporation, Tokyo (JP); Sony United Kingdom Limited, Weybridge (GB)

( * ) Notice: Subject to any disclaimer, the term of this patent is extended or adjusted under 35 U.S.C. 154(b) by 0 days.

(21) Appl. No.: 09/317,324

(22) Filed: May 24, 1999

Related U.S. Application Data

(63) Continuation of application No. 08/733,426, filed on Oct. 18, 1996.

(30) Foreign Application Priority Data

Oct. 30, 1995 (GB) ............................................. 9522170

(51) Int. Cl.[7] ................................................ H04N 7/18
(52) U.S. Cl. .............................. 375/240.19; 375/240.02
(58) Field of Search ................................ 348/384, 387, 348/390, 391, 404, 405, 407, 408, 411, 412, 415, 416, 420, 421, 700, 699; 375/240.01–240.27

(56) References Cited

U.S. PATENT DOCUMENTS

| | | | |
|---|---|---|---|
| 5,231,484 A | * 7/1993 | Gonzales et al. | 348/405 |
| 5,495,292 A | * 2/1996 | Zhang et al. | 348/407 |
| 5,532,746 A | * 7/1996 | Chang | 348/115 |
| 5,608,652 A | * 3/1997 | Astle | 361/514 |
| 5,617,145 A | * 4/1997 | Huang et al. | 348/390 |
| 5,680,483 A | * 10/1997 | Tranchard | 382/236 |
| 5,686,964 A | * 11/1997 | Tabatabai et al. | 348/420 |
| 5,687,257 A | * 11/1997 | Paik et al. | 382/251 |
| 5,751,358 A | * 5/1998 | Suzuki et al. | 348/405 |

FOREIGN PATENT DOCUMENTS

| | | |
|---|---|---|
| EP | 0 645 930 | 3/1995 |
| EP | 0 677 969 | 10/1995 |

OTHER PUBLICATIONS

Chen–Tie Chen et al. "Hybrid Extended MPEG Video Coding Algorithm for General Video Applications" Signal Processing. Image Communication, NL, Elsevier Science Publishers, Amsterdam, vol. 5, No. 1/02, 2/93, pp 21–37, XP000345611.

Keesman G et al., "Bit–Rate Control for MPEG Encoders" Signal Processing, Image Communication, NL, Elsevier Science Publishers, Amsterdam, vol. 6, No. 6, Feb. 1, 1995, pp 545–560, XP000491860.

* cited by examiner

*Primary Examiner*—Andy Rao
(74) *Attorney, Agent, or Firm*—Frommer Lawrence & Haug LLP; William S. Frommer; Bruno Polito

(57) ABSTRACT

Video data compression apparatus in which successive groups of two or more images are encoded subject to a predetermined limit on the quantity of output encoded data to be generated for each group of images, comprises a trial encoder for encoding at least a subset of images of a current group of images to generate trial-encoded data for each trial-encoded image; a data quantity allocator, responsive to the quantities of trial-encoded data generated by the trial encoder, for allocating respective quantities of output encoded data for each image in the group of images; and a final encoder for encoding each image of the group of images in accordance with the quantities of output encoded data allocated to that image by the data quantity allocator.

29 Claims, 9 Drawing Sheets

US 6,373,895 B2

VIDEO DATA COMPRESSION WITH TRIAL ENCODER

This application is a continuation of application Ser. No. 08/733,426 filed Oct. 18, 1996.

BACKGROUND OF THE INVENTION

1. Field of the Invention

This invention relates to video data compression.

2. Description of the Prior Art

Some video data compression systems, such as systems defined by the MPEG II standard[1], use a number of different coding techniques to encode successive pictures of a video signal.

[1] Motion Picture Experts Group II standard, described in the ISO/IEC Publication DIS 13818/2, "Information Technology—generic coding of motion pictures and associated audio information", March 1995.

Typically, the video signal is divided into successive groups of pictures (GOPs). Within each GOP at least one picture is encoded as an "I-picture", or intra-picture, using only information present in that picture itself. This means that I-pictures can later be decoded without requiring information from other pictures, and so provide random entry points into the video sequence. However, the converse of this is that the encoding of I-pictures cannot make use of the similarity between successive pictures, and so the degree of data compression obtained with I-pictures is only moderate.

Further pictures within each GOP may be encoded as "P-pictures" or predicted pictures. P-pictures are encoded with respect to the nearest previous I-picture or P-picture, so that only the differences between a P-picture and the previous P- or I-picture needs to be transmitted. Also, motion compensation is used to encode the differences, so a much higher degree of compression is obtained than with I-pictures.

Finally, some of the pictures within a GOP may be encoded as "B-pictures" or bidirectional pictures. These are encoded with respect to two other pictures, namely the nearest previous I- or P-picture and the nearest following I- or P-picture. B-pictures are not used as references for encoding other pictures, so a still higher degree of compression can be used for B-pictures because any coding errors caused by the high compression will not be propagated to other pictures.

Therefore, in each GOP there are (up to) three classes of picture, I-, P- and B-pictures, which tend to achieve different degrees of compression and so tend to require different shares of the overall available encoded bit stream. Generally, I-pictures require a large share of the available transmission or storage capacity, followed by P-pictures, and followed by B-pictures.

However, this is only a general rule, and while the trends might remain the same, the number of bits required to achieve an equal subjective quality of encoding for the pictures in a GOP may vary from GOP to GOP. Any errors in the allocation of transmission or storage capacity between pictures can lead to uneven or reduced subjective quality of the encoded frames, because errors, artifacts and noise due to compression will not be distributed evenly between the frames of the GOP.

It has been proposed to allocate shares in the available encoded bitstream to individual pictures within a GOP on the basis of the degree of compression obtained for corresponding pictures in a preceding GOP.

It is a constant aim in the field of video compression to improve the subjective quality of the encoded (and subsequently decoded) images.

SUMMARY OF THE INVENTION

This invention provides video data compression apparatus in which successive groups of two or more images are encoded subject to a predetermined limit on the quantity of output encoded data to be generated for each group of images, the apparatus comprising:

a trial encoder for encoding at least a subset of images of a current group of images to generate trial-encoded data for each trial-encoded image;

a data quantity allocator, responsive to the quantities of trial-encoded data generated by the trial encoder, for allocating respective quantities of output encoded data for each image in the group of images; and a final encoder for encoding each image of the group of images in accordance with the quantities of output encoded data allocated to that image by the data quantity allocator.

The invention recognises that even the technique described above in which shares in the available encoded bitstream are allocated to individual pictures within a current GOP on the basis of the degree of compression obtained for corresponding pictures in a preceding GOP does not necessarily lead to a satisfactory prediction of the quantity of encoded data which will be required to encode each picture of the current GOP to a substantially equal subjective standard. For example, because difference data (representing a motion-compensated difference between that picture and one or more reference pictures) is encoded for P- and B-frames, if a scene change occurs during the current GOP, the frame at which the scene change occurs will have a great deal of difference data and will require a larger number of bits to encode to a standard similar to that of other pictures in the GOP.

The invention addresses this problem by providing at least a partial rehearsal of the encoding of pictures within a GOP. In other words, at least some (and possibly all) of the pictures within a GOP are subjected to a trial encoding stage before being passed to a final encoding stage. The trial encoding stage does not need to assess the actual number of bits which will be required to encode each picture (bearing in mind any overall limit for each GOP imposed by the storage or transmission channel to be used), but is used merely to assess the relative proportions of the overall bitstream to be allocated to each picture.

In one embodiment, to save on hardware requirements, a single encoder may be operable alternately for each group of images as the trial encoder and the final encoder. If operation is required in real time, then preferably the single encoder is operated as both the trial encoder and the final encoder for a group of images during a time period equal to a display period of the group of images.

In one embodiment the trial and final encoders are full encoders, using decoded versions of one or more other trial-encoded or final-encoded images in the group of images. However, since the trial encoding is performed to assess the relative data requirements of the images in the group, processing resources can advantageously be saved by using input (rather than decoded) images in the trial encoder.

In one embodiment, for accuracy of operation of the data quantity allocator, the trial encoder is operable to trial-encode all of each group of images. In this case, preferably the data quantity allocator is operable to allocate quantities of output encoded data to each image of the group of images in proportion to the respective quantities of trial-encoded data for each image.

However, for economy of processing time or resources, in another embodiment the trial encoder is operable to trial-encode a subset of each group of images. In this case, preferably the data quantity allocator is operable to allocate quantities of output encoded data to each trial-encoded image of the group of images in proportion to the respective quantities of trial-encoded data for those images, and to allocate output encoded data to each non-trial encoded image of the group of images in proportion to the total quantity of trial-encoded data generated for that group and a respective predetermined ratio associated with each non-trial-encoded image of the group.

Preferably the trial encoder comprises a stage of data quantising, the data quantising stage operating using a predetermined degree of quantisation for each image in the group of images.

It is preferred that the predetermined degree of quantisation is selected to provide harsher quantisation of images in the group not used as reference images in the encoding of other images. This tends to lead to a greater data quantity allocation to images which are used as references for other images, thus tending to improve their subjective quality. However, although it may be expected that the subjective quality of the more harshly quantised images would then suffer, in fact, because the reference images are better, the non-reference images can also improve. Thus by the counter-intuitive step of quantising the non-reference images more harshly, all of the images' quality can potentially be improved.

The invention also provides a method of video data compression apparatus in which successive groups of two or more images are encoded subject to a predetermined limit on the quantity of output encoded data to be generated for each group of images, the method comprising the steps of:

trial-encoding at least a subset of images of a current group of images to generate trial-encoded data for each trial-encoded image;

allocating respective quantities of output encoded data for each image in the group of images in response to the quantities of trial-encoded data generated by trial-encoding; and final-encoding each image of the group of images in accordance with the quantities of output encoded data allocated to that image by the data quantity allocator.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 1:
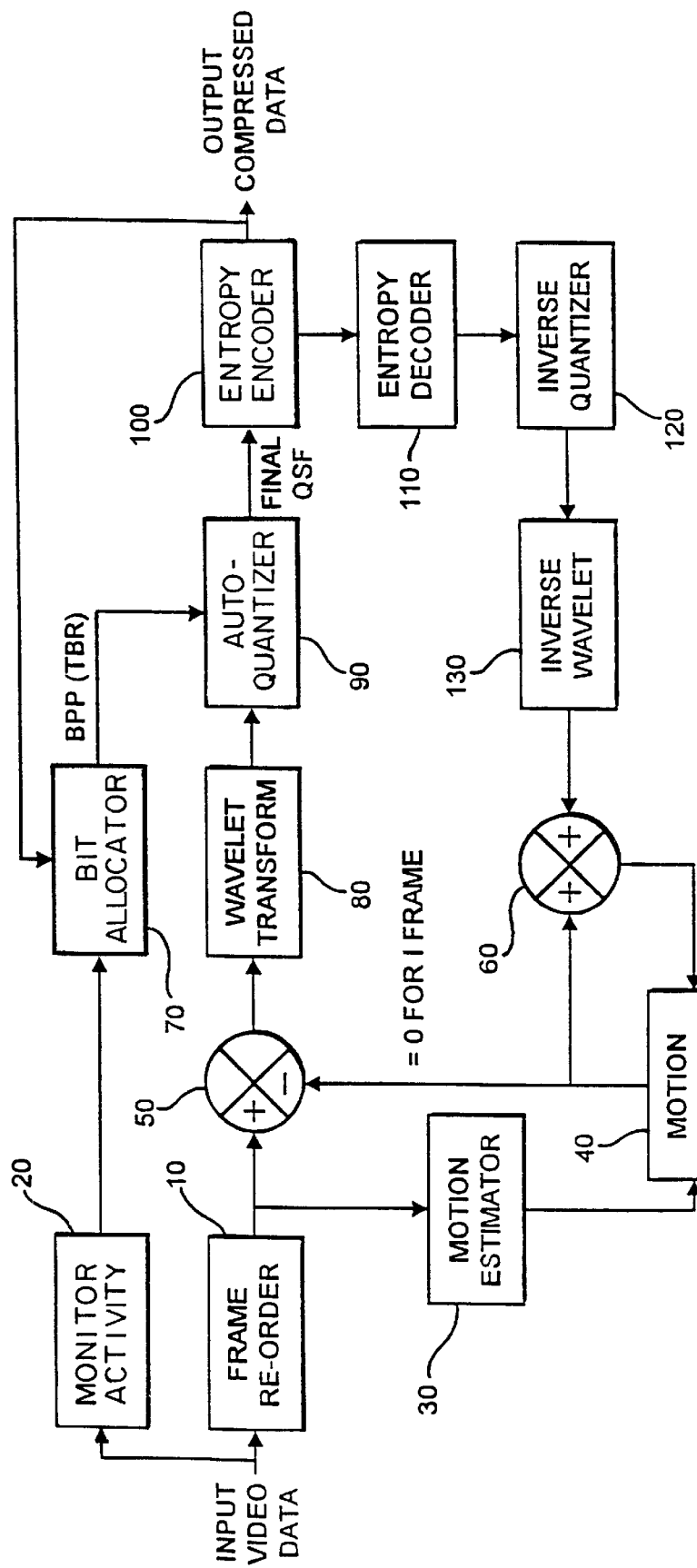
FIG. 1 is a schematic diagram of a video data compression apparatus.

FIG. 1 is a schematic diagram of a video data compression apparatus comprising a frame reorderer 10, an activity detector 20, a motion estimator 30, a motion predictor 40, a subtractor 50, an adder 60, a bit allocator 70, a wavelet transform unit 80, an auto-quantiser 90, an entropy encoder 100, an entropy decoder 110, an inverse quantiser 120 and an inverse wavelet coder 130.

(Where a reference is made in this description to wavelet encoding, it will be appreciated by the skilled man that other encoding techniques, for example the discrete cosine transform or DCT, may be used instead).

Many features of the apparatus of FIG. 1 operate in a very similar manner to corresponding features of an MPEG encoder. Such features will not be described in detail here.

Briefly, therefore, the frame reorderer 10 receives input video data and acts on successive groups of pictures (GOP) to reorder the pictures so that each picture within the GOP is compressed after those pictures on which it depends. For example, if a B-picture (bi-directionally predicted picture) depends on a following I- or P-picture, it is reordered to be compressed after that I- or P-picture.

For example, if a GOP comprises the following four initial frames (in the order in which they are displayed), $I_0 B_1 B_2 P_3 \ldots$, where the P-picture uses the I-picture as a reference and the two B-pictures use the surrounding I- and P-pictures as references, then the frame reorderer 10 will reorder the GOP to be compressed in the following order: $I^0 P_3 B_1 B_2 \ldots$.

I-pictures are intra-picture encoded, that is to say the encoding is not based on any other reference pictures. An I-picture in a GOP is therefore passed from the frame reorderer 10 to the wavelet transform unit 80, the auto quantiser 90 and the entropy encoder 100 to generate output compressed data representing that I-picture.

The compressed I-picture data is also passed from the entropy encoder 100 through a decompression chain formed by the entropy decoder 110, the inverse quantiser 120, and the inverse wavelet transform unit 130. This reconstructs a version of the I-picture present in the decoder which is passed to the motion predictor 40.

The next picture of the GOP to be compressed, which will generally be a P-picture which depends on the I-picture as a reference, is passed from the frame reorderer 10 to the motion estimator 30 which generates motion vectors indicative of image motion between the I- and P-pictures. The motion predictor 40 then generates a predicted version of the P picture using the motion vectors and the decoded version of the I-picture. This predicted version of the P-picture is subtracted from the actual P-picture by the subtractor 50 and the difference between the 2 frames is passed to the wavelet transform unit 80 for compression. As before, the encoded (compressed) difference data is output by the entropy encoder and is then decoded by the decompression chain 110,120,130 to regenerate a version of the difference data.

In the adder 60 the difference data is then added to the previously decompressed version of the I-picture to generate a decompressed version of the P-picture which is then stored in the motion predictor 40 for use in the compression of the next picture.

This process continues, so that each picture which uses other pictures as a reference is in fact compressed by encoding difference data between the input picture and a version of the input picture formed by motion prediction from a previously compressed and then decompressed version of the reference picture. This means that the compression is performed with respect to the pictures which will be available at the decompressor.

The activity detector 20 detects the image "activity", or "degree of detail" in blocks of each input image. This process will be described in more detail with reference to FIG. 2 below.

The bit allocator 70 allocates target bit rates to whole pictures or blocks of the pictures in dependence on the image activity of pictures of the current GOP and the degree of quantisation obtained for I-, B and P-pictures of the preceding GOP. In fact, the allocation can be made by allocating an overall target bit rate for each GOP (TBR$_{GOP}$) in proportions dependent on the actual quantity of data generated for the corresponding frame in the preceding GOP, or in accordance with the actual I:B:P ratio achieved with the preceding GOP. In this way, the allocation or the I:B:P ratio can be "steered" to reflect the type of image content in use.

The target bits rates are supplied to the auto quantiser 90 which generates a suitable quantisation factor to be applied to the wavelet encoded data to comply with the target bit rates. The auto quantiser will be described in more detail with reference to FIG. 3 below.

Figure 2:
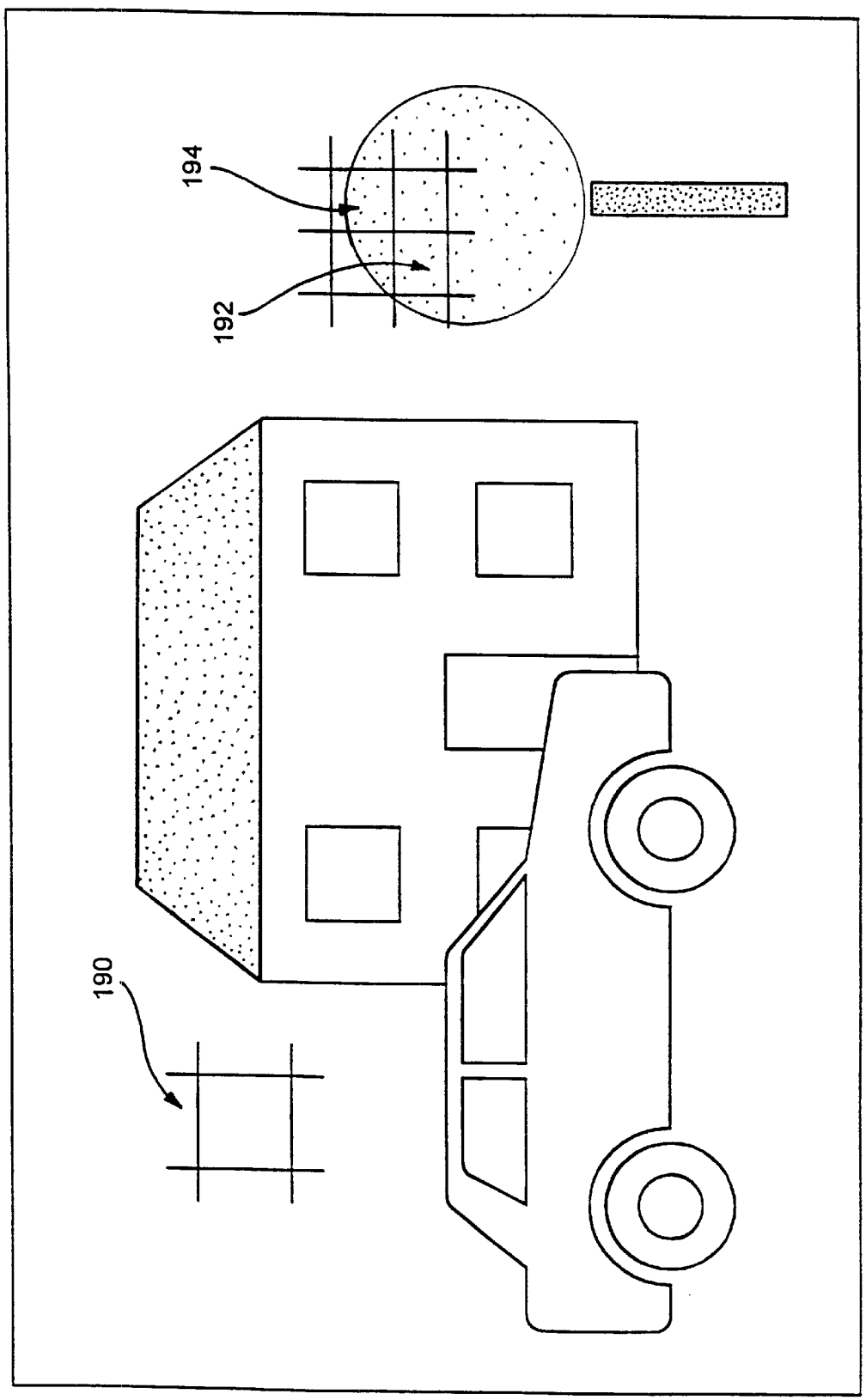
FIG. 2 is a schematic diagram of a video picture illustrating different levels of image activity.

FIG. 2 is a schematic diagram of a video picture illustrating different levels of image activity.

The "activity" of a block of a picture is a measure of the degree of detail in that block. This means that a block representing a plain, bland area of the picture, such as an area of sky 190 in FIG. 2 has a low image activity. A block which includes a great deal of image detail such as an area 192 of the tree in FIG. 1, has a high activity. FIG. 1 also illustrates an intermediate area 194 at the edge of the tree, which has an activity value between that of the block 190 and that of the block 192.

The activity of each block of pixels in the image of FIG. 2 can be measured by determining the variance ($\sigma^2$) of the luminance values of the pixels in that block. The block activity is then derived by dividing the luminance variance for each block by the mean of variances for all of the blocks in the image. This yields a normalised block activity value:

$$\text{block activity} = \frac{\text{block } \sigma^2}{\text{mean } (\sigma^2)}$$

The image activity is monitored and sudden changes of at least a predetermined threshold between successive images of a GOP are detected. This type of sudden change can be indicative of a scene change occurring during the GOP. If such a sudden change is detected, then the bit allocator responds by resetting the "steered" I:B:P ratio to a default value intended to cope reasonably with the image content after the scene change.

A further justification for measuring image activity is that available space in a compressed video data stream can be allocated block-by-block (or by groups of blocks) depending on the respective measured block activities. In other words, the degree of data compression applied to each block or group of blocks is varied depending on the activity measured for that block or group of blocks.

The degree of compression can be varied (by varying the target bit rates supplied to the auto-quantiser 90) in dependence on the activity values because it has been observed that compression artifacts and distortions are more subjectively disturbing in blocks of low detail content (low activity, such as the plain sky area 190) than in blocks of high detail content (high activity, such as the block 192 of the tree in FIG. 2). This is because the high level of detail in a block of high activity tends to distract the eye from the compression artifacts or distortions. Therefore, the target bit rates for areas or blocks of low image activity can be set to be higher than those for areas or blocks of high image activity.

One way of varying the target bit rates in response to the image activity is to increase or decrease the target bit rates by up to, say, 50%, in proportion to the image activity value. Here, the values should be normalised over the entire image or GOP so that the overall effect of the activity-value weighting of the target bit rates does not cause the target bit rates to exceed TBR$^{GOP}$.

Figure 3:
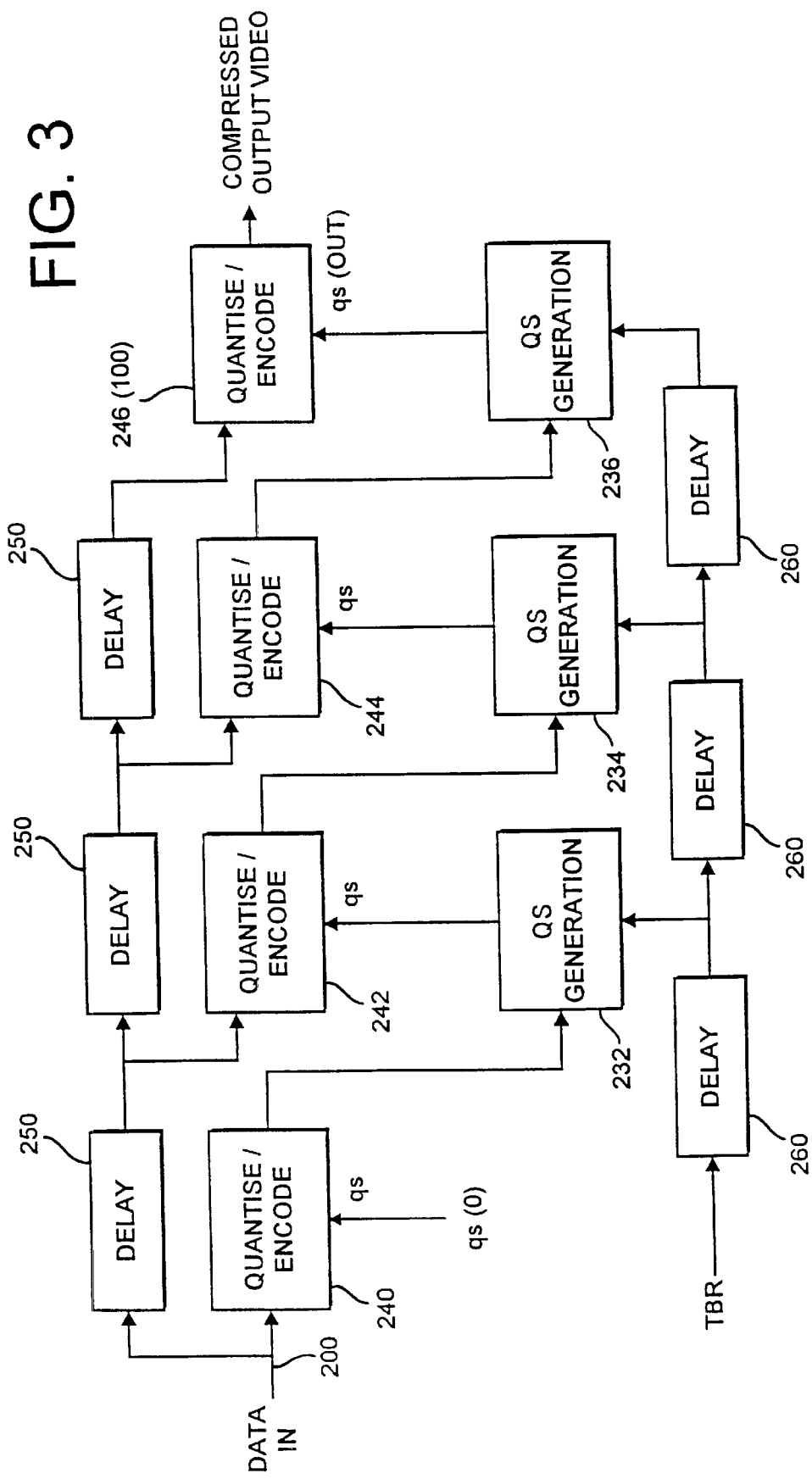
FIG. 3 is a schematic diagram of an auto-quantiser.

FIG. 3 is a schematic diagram of the auto-quantiser 90. (In fact, the apparatus of FIG. 3 performs the function of the auto-quantiser 90 and the entropy encoder 100 of FIG. 1).

The auto-quantiser 90 receives frequency separated video data on an input terminal 200 and an initial quantisation coefficient value, Qs(0), on an input terminal 210.

The initial Qs value, Qs(0), may be a predetermined or preset number such as 64, or could be generated in response to the properties of the current video data being compressed.

The quantiser/encoder 240 quantises the current block of video data using the initial QS value supplied, and either performs a full Huffman coding process on the quantised data or simply detects the length of a variable length code which would result from the Huffman coding process (both of these are known techniques). In this way, the quantiser/encoder detects the amount of data which would result from quantising the input frequency separated video data using the supplied initial QS value.

A Qs generator 232 compares the output bit rate of the quantiser/encoder 240 using the current QS value with the target bit rate for the current picture/area of a picture. If the detected output bit rate is lower than the target bit rate, then the quantisation scale factor should be reduced to apply less harsh quantisation to the frequency separated image data. Conversely, if the detected output bit rate is higher than the target bit rate, the quantisation scale factor should be increased. The qs generator 232 therefore either increases or decreases the initial Qs value, Qs(0) by a predetermined proportion such as 50%, and supplies the modified Qs value, Qs(1) to a second quantiser/encoder 242. Accordingly, if the initial Qs value is 4, then the value qs(1) will be either 2 or 6.

This process is continued at each stage of the auto-quantiser, until the last stage 244 reached. There the qs value which will result in the quantity of output data being close to but not exceeding the target bit rate for the current picture area is used as qs(out).

The apparatus of FIG. 3 involves a three-stage binary search process to obtain the qs value. It will be appreciated that in practice more stages could be used to define the qs value to a higher resolution.

The final quantisation scale factor generated by this process, QS (out) may simply be output to a separate quantiser and entropy encoder. However, an alternative is illustrated in FIG. 3, where a final quantiser/encoder 246 takes the place of a separate quantiser and the entropy encoder 100 of FIG. 1, to generate the compressed output video.

The selection of the output quantisation scale factor QS (out) can be made for individual blocks of the image e.g. 8×8 blocks of pixels, for groups of blocks, for regions of the image such as "slices" (horizontal strips of the image) or for an entire picture.

Figure 4:
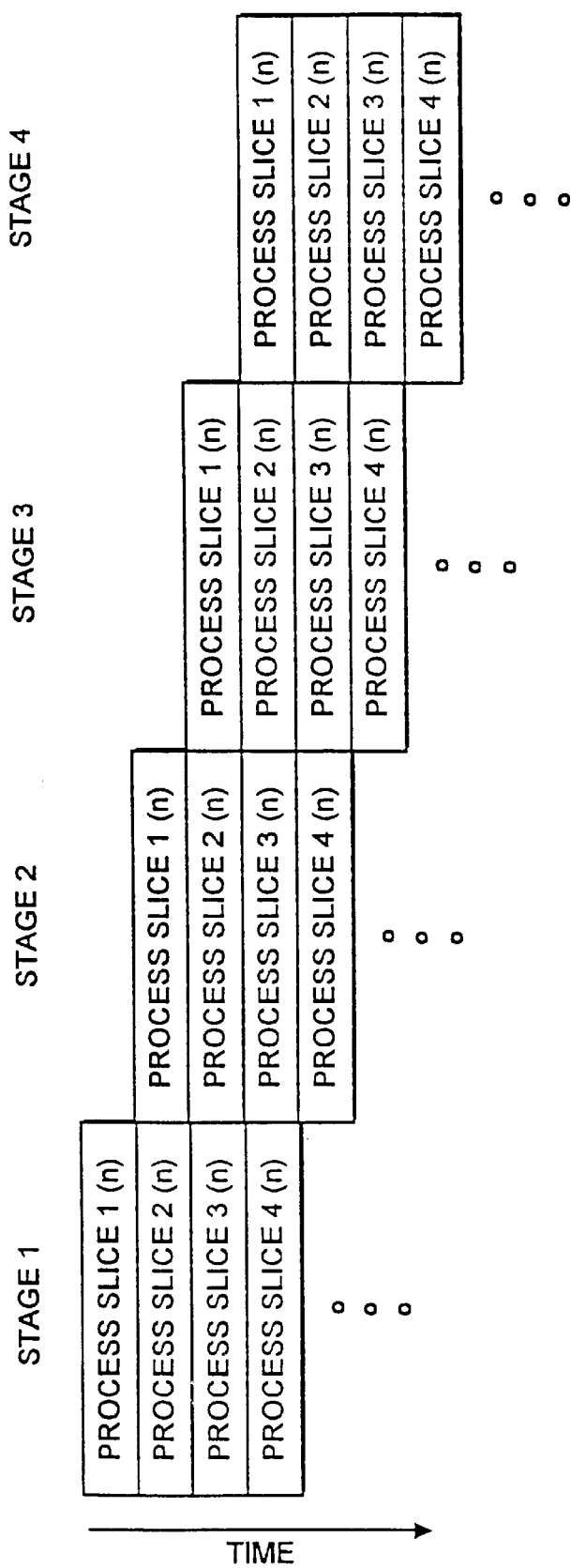
FIG. 4 is a schematic timing diagram illustrating the operation of the auto-quantiser of FIG. 3.

FIG. 4 is a schematic timing diagram illustrating the operation of the auto-quantiser of FIG. 3.

The examples shown in FIG. 4 is that of processing each image as a series of "slices", ie horizontal stripes formed of groups of macroblocks. However, as mentioned above, the staged processing illustrated in FIG. 4 could be performed on various types of blocks of each picture. It is advantageous if the blocks on which the staged processing of FIG. 4 is performed are co-sited with the blocks for which individual target bit rates are defined. In other words, co-sited blocks of the same size or larger that those for which the TBRs are defined are preferred.

The first process is that stage one of the auto quantiser (the quantiser/encoder 240 of FIG. 3) processes a first slice of an image. When that processing is complete, that stage processors second, third, fourth and so on slices of the image.

When the processing of slice 1 has been completed by stage one, stage 2 takes on the processing of slice 1. When this has been completed, stage 3 works on slice 1, and finally when this has been completed, stage 4 works on slice 1. This technique leads to lower delays being caused by the auto-quantiser; if each stage had to wait until a preceding stage had completed processing of a whole image, the 4-stage auto-quantiser of FIG. 3 would have a minimum delay of 4 picture periods. This delay is much reduced using the processing technique with individual blocks.

Figure 5:
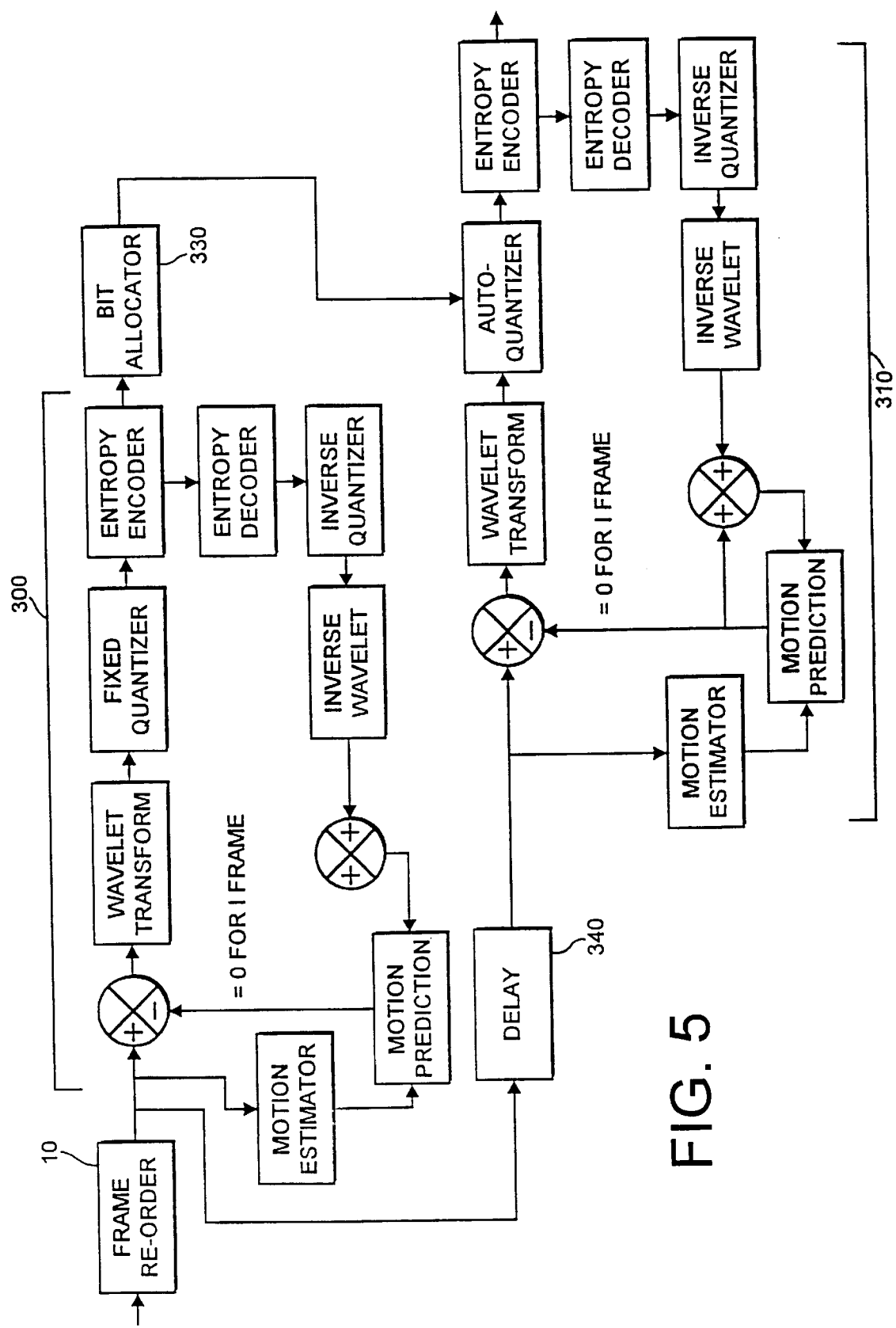
FIG. 5 is a schematic diagram of a second video data compression apparatus.

FIG. 5 is a schematic diagram of a second video data compression apparatus. The apparatus of FIG. 5 no longer uses the activity detector 20 or compression performance results from a previous GOP to set target bit rates for individual pictures of a GOP, but instead performs a trial or rehearsal compression and decompression of at least some of the pictures of each GOP.

The apparatus of FIG. 5 may be considered as a trial encoder 300, which operates in much the same way as the apparatus of FIG. 1, and a final encoder 310, which again operates in much the same way as the apparatus of FIG. 1. The main difference between the trial encoder 300 and FIG. 1 (apart from the lack of the activity detector and bit allocator) is that it uses a fixed quantiser 320 with a predetermined quantising factor.

In operation, the trial encoder 300 compresses a GOP (or at least some of the pictures of a GOP), using a fixed quantisation factor. The purpose of this is to assess the relative quantities of compressed data required by the different pictures or types of picture within the GOP.

While the trial compression is being performed, the GOP is stored in a delay unit 340.

The compressed data output by the entropy encoder of the trial compressor 300 is supplied to a bit allocator 330. The way in which the bit allocator 330 operates depends on whether all or some of the pictures are subject to trial compression.

If all of the pictures of a GOP are subject to trial compression, the bit allocator 330 then allocates target bit rates for final compression in accordance with the ratio of quantities of data generated during trial compression and subject to the overall limit on the storage or transmission channel's capacity (eg 30 Mbps—Mega bits per second). In order words, each picture in a GOP is allocated a quantity of data according to the following derivation:

$$TBR_n = \frac{b_n}{\sum_{0}^{GOP} b_n} \cdot TBR_{GOP}$$

where $b_n$ is the quantity of trial data generated for the nth picture in the GOP and $TBR_n$ is the target bit rate allocated to the nth picture.

If only some of the pictures in a GOP are subject to trial compression, but that sub set of pictures includes each type of picture present in the GOP, then an I:B:P ratio can be established for use with all pictures in that GOP. An I:B:P ratio, according to which the pictures in the GOP are then allocated quantities of compressed data, is derived using the following formulae:

$$I:B:P = \frac{\sum_{I-pictures} b_n}{N_{trial}(I)} : \frac{\sum_{P-pictures} b_n}{N_{trial}(P)} : \frac{\sum_{B-pictures} b_n}{N_{trial}(B)}$$

Finally, if the GOP contains I, B and P pictures, but only I- and P-pictures are subject to trial compression, a B:P ratio must be used to allocate quantities of data to the B pictures based on that available to I- and P-pictures. This B:P ratio could be fixed, or could be steered using the output of the final entropy encoder of the final compressor 310 having compressed the preceding GOP.

It will be appreciated that the above techniques can also be applied to sub-areas (e.g. blocks or "slices") of the pictures.

Once the bit allocation has been performed by the bit allocator 330, the GOP is passed from the delay unit 340 into the final compressor 310. The auto quantiser of the final compressor 310 controls the degree of quantisation applied to the image data so that the overall bit rate complies with the target bit rates generated by the bit allocator 330.

Figure 6:
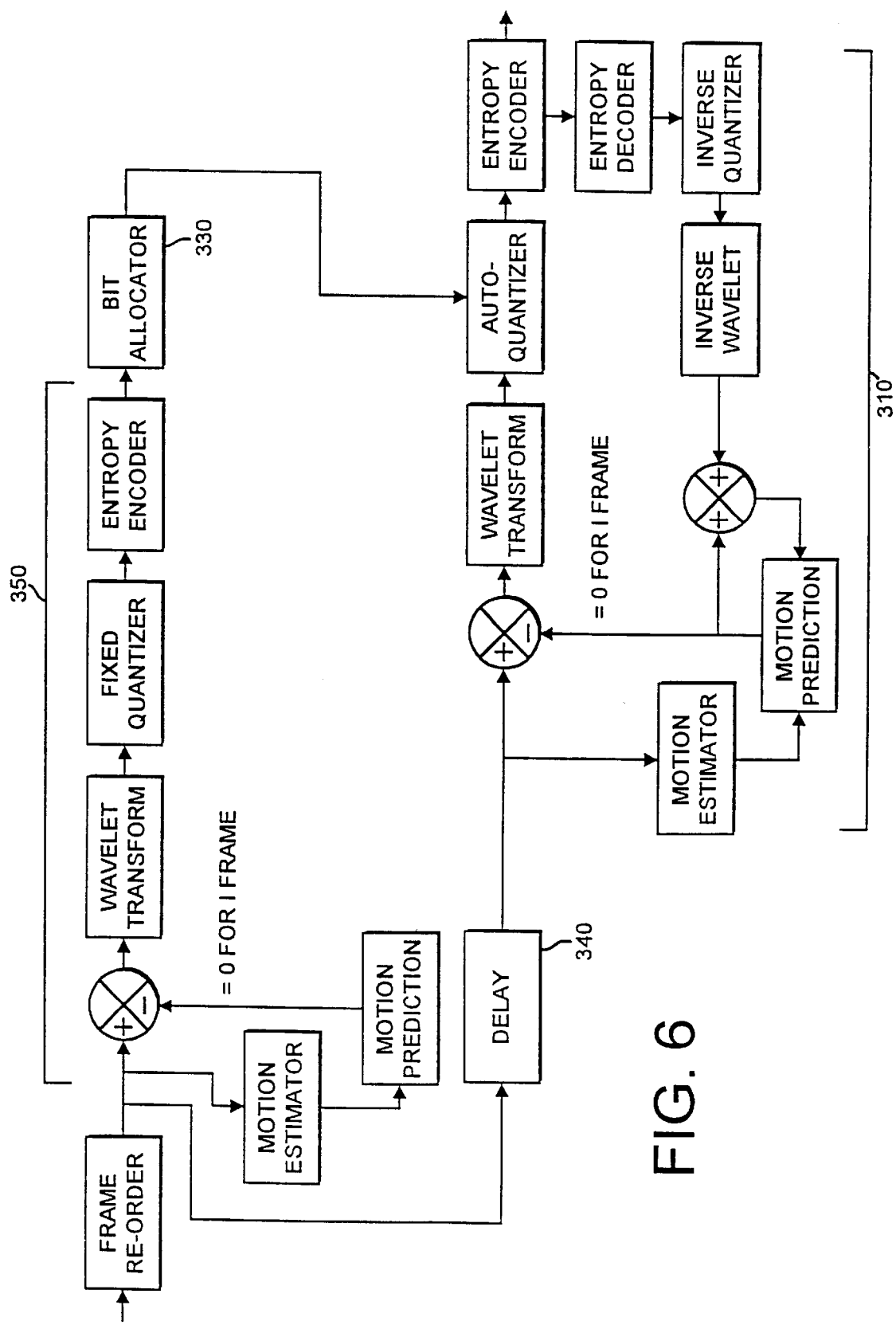
FIG. 6 is a schematic diagram of a third video data compression apparatus.

FIG. 6 is a schematic diagram of a third video data compression apparatus.

Again, the apparatus of FIG. 6 comprises a trial compressor 350 and a final compressor 310, with the trial compressor 350 supplying trial compressed data to a bit allocator 330 to control target bit rates to be used in final compression.

In contrast to the apparatus of FIG. 5, the trial compressor 350 does not have a feedback loop of an entropy decoder, an inverse quantiser and an inverse wavelet coder. Instead, during trial compression, B- and P-pictures are compressed with respect to the input versions of the respective reference pictures. This means that the compression will be slightly less accurate than a full compression using the feedback loop described above, but since the compression is only for the purposes of assessing approximate relative quantities of data required by each picture of the GOP, this slight inaccuracy does not matter and is more than compensated for by a saving in hardware or processing resources.

Figure 7:
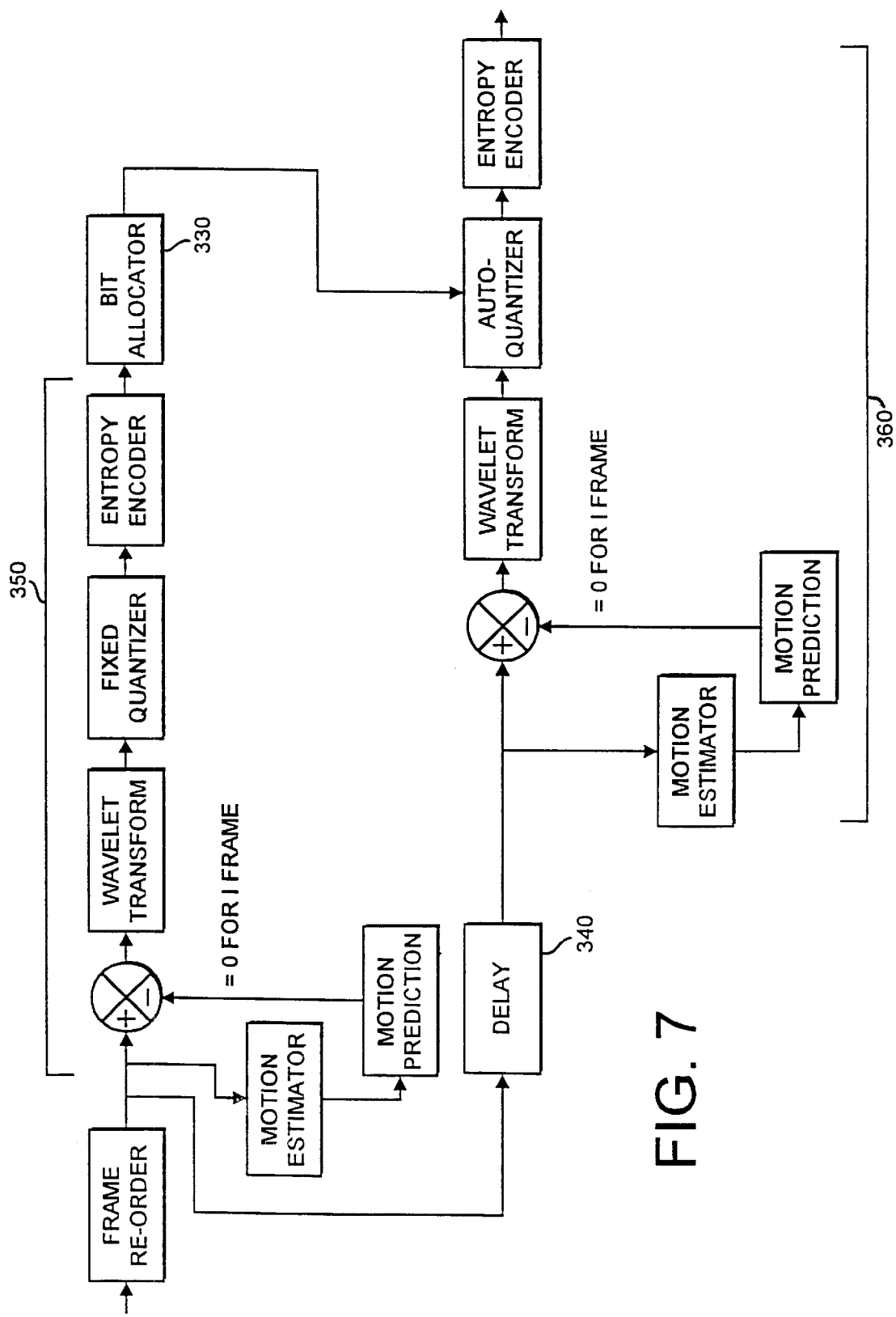
FIG. 7 is a schematic diagram of a fourth video data compression apparatus.

FIG. 7 illustrates a similar arrangement being used in the trial compressor 350 and in a final compressor 360. Again, this can be useful where economy of processing resources is as important as compression accuracy.

Figure 8:
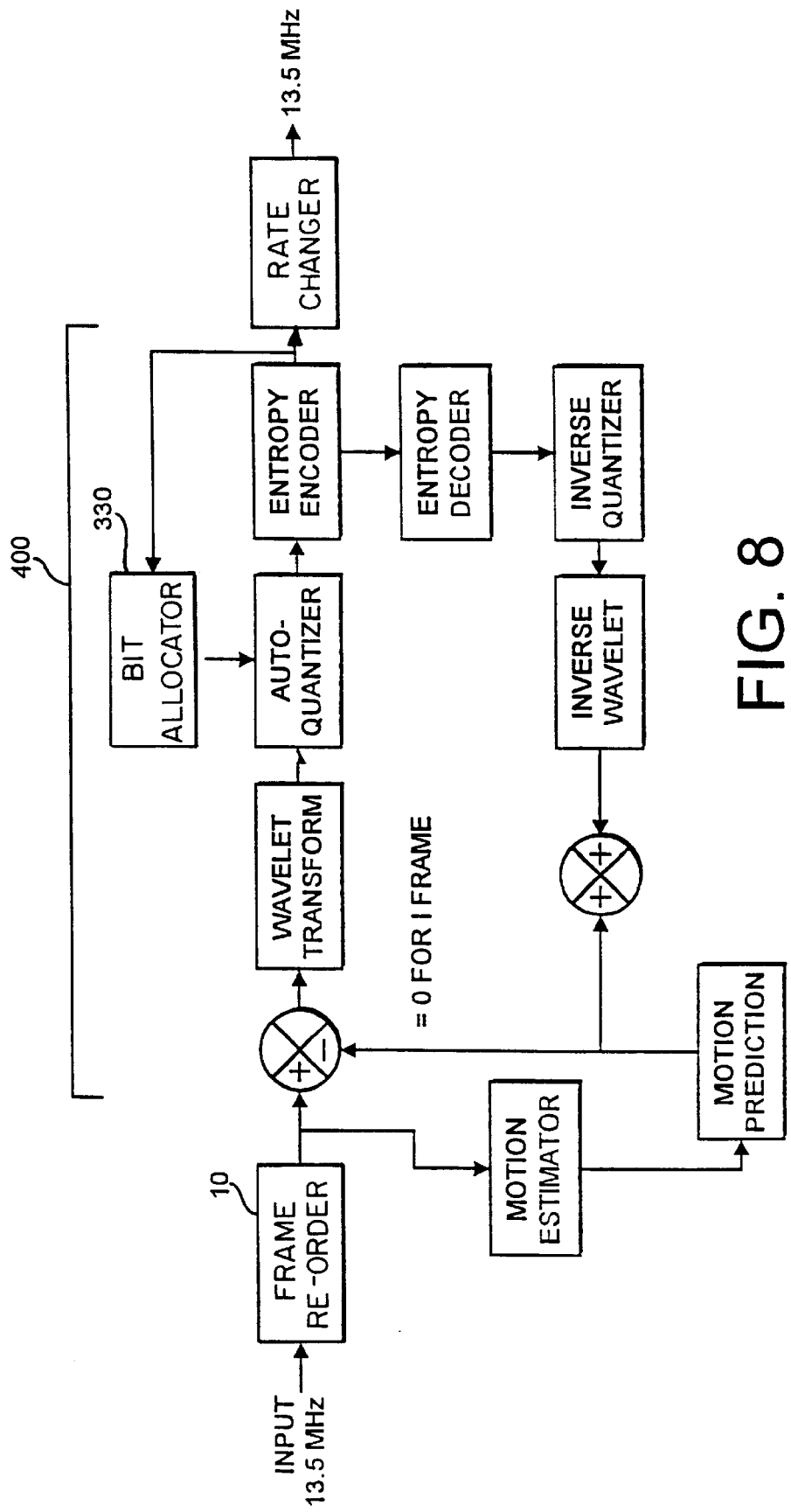
FIG. 8 is a schematic diagram of a fifth video data compression apparatus.

FIG. 8 is a schematic diagram of a fifth video data compression apparatus. This apparatus comprises a single compressor 400 which acts alternately as the trial compressor and the final compressor of any of the embodiments described earlier. This is achieved by running the processing of the compressor 400 at a faster speed than the data rate of the input video.

For example, a standard video data rate for the input video supplied to the frame reorderer 10 is 30.5 MHz. However, if the compressor 400 is operated at a basic video data rate of, say, 27 MHz, it has the ability to process the input video data of a GOP once for trial compression (in which the auto quantiser in fact operates at a fixed quantisation level) and then again for final compression in which the bit allocator 330 uses the quantities of data generated during trial compression to control the auto quantiser (now working with a variable quantisation factor).

If, for example, a 12 frame GOP is being processed and it is desired to perform trial quantisation on 4 frames of the GOP, the compressor 400 can be operated at 4/3 of the basic video data rate of 13.5 MHz, ie 18 MHz.

Figure 9:
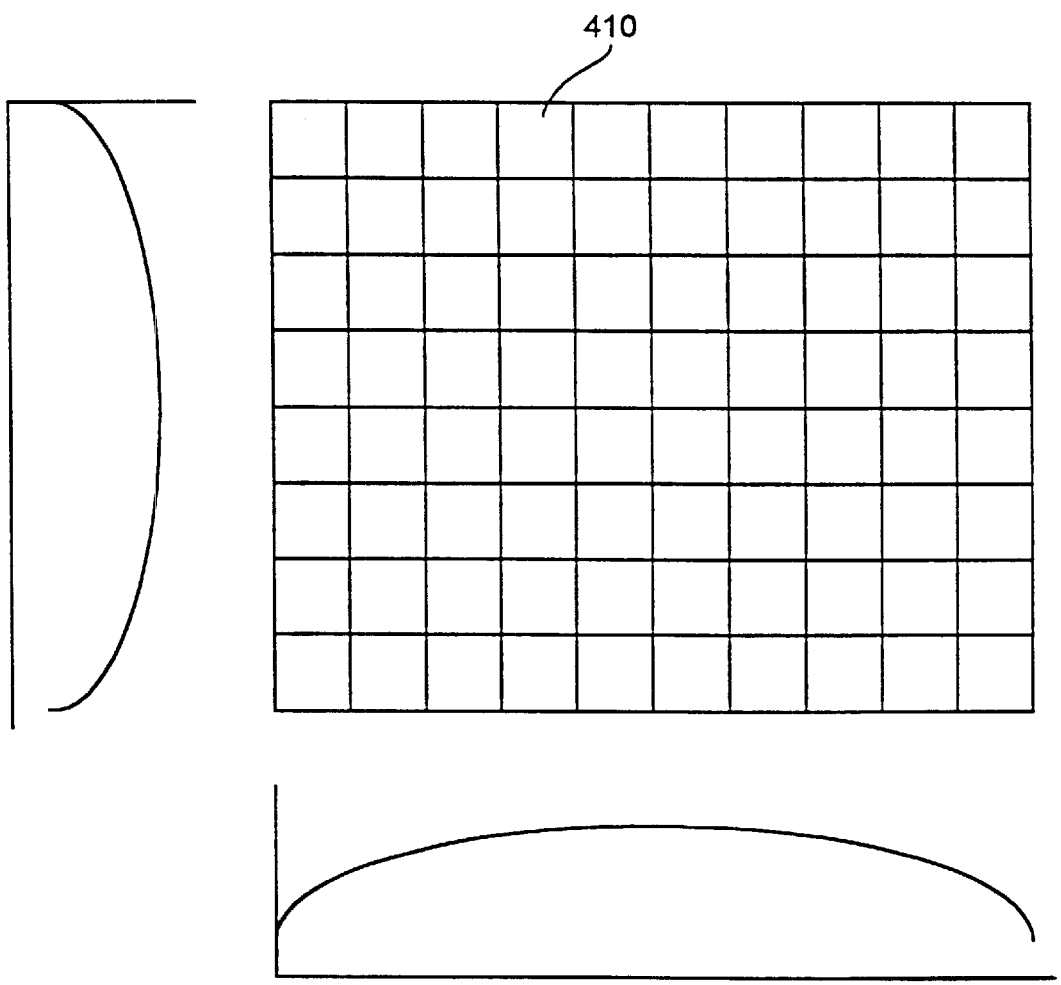
FIG. 9 is a schematic diagram illustrating the weighting of target bit rates.

Finally, FIG. 9 is a schematic diagram illustrating the weighting of target bit rates within an image.

As already described, target bit rates can be allocated to individual macroblocks, groups of macroblocks, slices, stripes and various other shaped blocks within an image. In the example shown in FIG. 9, separate target bit rates are allocated to individual code blocks 410 of an image.

A weighting is applied to the target bit rates for blocks of the image, so that blocks towards the centre of the image are given higher target bit rates, all other factors being equal. This is done for two main reasons:

(a) the viewer's centre of attention tends to be the middle of the picture, and so the viewer tends to notice coding errors more in the centre of the picture than at the edges, and (b) many domestic television sets overscan so that the extreme periphery of the picture is not seen by the home viewer at all.

Accordingly, the allocation scheme weights the allocation towards the centre of the pictures. This weighting towards the centre is also of particular benefit with so-called "letterbox" film transmission.

The graphs at the side and bottom of FIG. 9 illustrate one possible envelope for weighting coefficients to be applied to the target bit rates for different blocks in the image.

In all of the above schemes for allocating target bit rates, each block, slice or image is allocated at least a predetermined minimum (non-zero) target bit rate by the bit allocator. This allows for image content not anticipated by the bit allocator and avoids areas of the picture being allocated such a small target bit rate that the image cannot be encoded.

In another preferred feature, the target bit rates (and in turn the degree of compression applied) can be varied in direct dependence on the picture type. In particular, in an I:B:P system a B picture (or areas of a B-picture) can be allocated a lower TBR than other pictures, since it is not used as a reference for any other pictures. This tends to lead to a higher bit allocation to pictures which are used as references for other pictures. However, although it may be expected that the subjective quality of the more harshly quantised images would then suffer, in fact, because the reference pictures are better, the non-reference pictures can also improve.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Video data compression apparatus in which successive group of images including intra-coded images and inter-coded images are encoded, said apparatus comprising:

a trial encoder for encoding respective image data comprising at least a subset of image data of a current group of images to generate respective trial-encoded data for each respective image data, said respective trial-encoded data having respective quantities of data;

a data quantity allocator, responsive to the quantities of trial-encoded data generated by said trial encoder, for allocating respective target quantities of output encoded data for said respective image data; and a final encoder for encoding said respective image data of said current group of images in accordance with the respective target quantities of output encoded data allocated to that respective image data by said data quantity allocator;

wherein when a scene change is detected at a point within said respective image data by examining the normalized variance of at least a portion of said respective image data, said allocator sets to a default value a ratio of intra-coded image target quantity to inter-coded image target quantity;

whereby the normalized variance is generated by dividing the variance of said portion of said respective image data by the mean variance for said portion and one or more similar portions.

2. Apparatus according to claim 1, comprising a single encoder which alternately performs the functions of said trial encoder and said final encoder.

3. Apparatus according to claim 2, wherein said single encoder performs the functions of both said trial encoder and said final encoder for said current group of images during a time period equal to a display period of said current group of images.

4. Apparatus according to claim 1, wherein:

said trial encoder encodes at least some of said images in each respective group of images based on decoded versions of one or more other trial-encoded images of the respective group of images; and said final encoder encodes at least some of said images in each respective group of images based on decoded versions of one or more other final-encoded images of the respective group of images.

5. Apparatus according to claim 1, wherein:

said trial encoder encodes at least some of said images in each respective group of images based on one or more other input images of the respective group of images; and said final encoder encodes at least some of said images in each respective group of images based on decoded versions of one or more other final-encoded images of the respective group of images.

6. Apparatus according to claim 1, wherein:

said trial encoder encodes at least some of said images in each respective group of images based on one or more other input images of the respective group of images; and said final encoder encodes at least some of said images in each respective group of images based on one or more other images of the respective group of images.

7. Apparatus according to claim 1, wherein said trial encoder encodes all images in each group of images.

8. Apparatus according to claim 7, wherein said data quantity allocator allocates target quantities of output encoded data for respective image data of said current group of images in accordance with said quantity of the respective image data relative to the quantities of trial-encoded data generated by said trial encoder.

9. Apparatus according to claim 1, wherein said trial encoder encodes a subset of images of each group of images.

10. Apparatus according to claim 1, wherein said trial encoder comprises stages of data quantizers for quantizing said image data using a predetermined degree of quantisation based on a previous stage for each respective image data in said group of images.

11. A method of video data compression wherein successive groups of images including intra-coded images and inter-coded images are encoded, said method comprising the steps of:
   trial-encoding respective image data comprising at least a subset of image data of a current group of images to generate respective trial-encoded data for each respective image data, said respective trial-encoded data having respective quantities of data;
   allocating respective target quantities of output encoded data for respective image data of said current group of images in response to the quantities of trial-encoded data generated in said step of trial-encoding; and
   final-encoding said respective image data of said current group of images in accordance with said respective target quantities of output encoded data allocated to that respective image data in said step of allocating;
   wherein when a scene change is detected at a point within said respective image data by examining the normalized variance of at least a portion of said respective image data, said step of allocating involves setting to a default value a ratio of intra-coded image target quantity to inter-coded image target quantity;
   whereby the normalized variance is generated by dividing the variance of said portion of said respective image data by the mean variance for said portion and one or more similar portions.

12. The apparatus according to claim 1, wherein said image data are slices of a video frame and said trial encoder encodes said slices according to MPEG standards.

13. The apparatus according to claim 3, wherein said trial-encoder and said final encoder encode said image data at a faster rate than said image data is input such that said image data is encoded in real-time.

14. The apparatus according to claim 1, further comprising weighting means for weighting said target quantities of image data such that image data to be displayed substantially in the center of a display have higher target quantities than other image data.

15. The apparatus according to claim 1, wherein said image data are I-pictures, P-pictures and B-pictures of MPEG standards and said data quantity allocator allocates lower target quantities to said B-pictures.

16. The method according to claim 11, wherein said image data are slices of a video frame and said step of trial-encoding encodes said slices according to MPEG standards.

17. The method according to claim 11, further comprising the step of weighting said target quantities of image data such that image data to be displayed substantially in the center of a display have higher target quantities than other image data.

18. The method according to claim 11, wherein said image data are I-pictures, P-pictures and B-pictures of MPEG standards and said step of allocating allocates lower target quantities to said B-pictures.

19. An image compression apparatus for encoding a group of images including intra-coded images and inter-coded images, said apparatus comprising:
   an activity detector for detecting activity of an image by determining the degree of image detail in a block of a respective image of said group of images, and for detecting a scene change between images of said group of images by detecting a change between successive images;
   a bit rate allocator for allocating a target bit rate for encoding said group of images in dependence on said activity detected by said activity detector; and
   an encoder for encoding said group of images in accordance with said target bit rate allocated by said bit rate allocator;
   wherein when a scene change is detected at a point within said group of images by examining the normalized variance of at least a portion of said group of images, said allocator sets to a default value a ratio of intra-coded image target bit rate to inter-coded image target bit rate;
   whereby the normalized variance is generated by dividing the variance of said portion of said respective image data by the mean variance for said portion and one or more similar portions.

20. The apparatus according to claim 19, wherein said activity detector detects luminance variance of pixels in said block of said respective image to determine said activity.

21. The apparatus according to claim 19, wherein said bit rate allocator allocates a higher target bit rate when said activity detector detects a low image activity.

22. The apparatus according to claim 19, further comprising a quantizer for quantizing said group of images in accordance with a quantization step size, wherein said quantization step size is selected such that the quantized group of images has a bit rate commensurate with said target bit rate allocated by said bit rate allocator.

23. An image compression apparatus for encoding a group of images including intra-coded images and inter-coded images, said apparatus comprising:
   a plurality of quantizers for quantizing said group of images in accordance with a target bit rate; and
   a plurality of generators for generating respective quantization scale factors, wherein said plurality of quantizers and said plurality of generators are cascaded such that a quantized result of a previous quantizer is applied to a successive generator which generates a respective quantization scale factor based on said quantized result from said previous quantizer, wherein said respective quantization scale factor is applied to a successive quantizer for quantizing said group of images in accordance with said target bit rate;
   wherein when a scene change is detected at a point within said group of images by examining the normalized variance of at least a portion of said group of images, a ratio of intra-coded image target bit rate to inter-coded image target bit rate is set to a default value;
   whereby the normalized variance is generated by dividing the variance of said portion of said respective image data by the mean variance for said portion and one or more similar portions.

24. The apparatus according to claim 23, further comprising a plurality of delays for delaying said group of images quantized by each quantizer; each delay having a delay time corresponding with the input of the quantization scale factor from a previous generator.

25. The apparatus according to claim 23, wherein a respective image of said group of images is comprised of successive slices of image data representing one or more pixels of said respective image; wherein each quantizer processes a slice of said respective image thereby resulting in a respective quantized slice with a respective bit rate, wherein said respective quantized slice is applied to said successive generator which generates said respective quantization scale factor in accordance with said target bit rate.

26. The apparatus according to claim 1, wherein said data quantity allocator allocates relative proportions of a bit stream of bits representing said images to be allocated to each image based on said quantities of trial-encoded data encoded by said trial encoder.

27. The method according to claim 11, wherein said step of allocating allocates relative proportions of a bit stream of bits representing said images to be allocated to each image based on said quantities of trial-encoded data generated in said step of trial-encoding.

28. The apparatus according to claim 19, wherein said bit rate allocator allocates relative proportions of a bit stream of bits representing said images to be allocated to each image based on said activity detected by said activity detector.

29. The apparatus according to claim 23, wherein each previous quantizer functions as a trial encoder such that the successive quantizer allocates relative proportions of a bit stream of bits representing said images to be allocated to each image based on an amount of data generated by said previous quantizer.

* * * * *